(12) United States Patent
Suh et al.

(10) Patent No.: US 9,179,125 B2
(45) Date of Patent: Nov. 3, 2015

(54) METHOD FOR PROCESSING THREE DIMENSIONAL (3D) VIDEO SIGNAL AND DIGITAL BROADCAST RECEIVER FOR PERFORMING THE METHOD

(75) Inventors: Jong Yeul Suh, Seoul (KR); Jeong Hyu Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 374 days.

(21) Appl. No.: 13/143,167

(22) PCT Filed: Dec. 4, 2009

(86) PCT No.: PCT/KR2009/007213
§ 371 (c)(1),
(2), (4) Date: Jul. 1, 2011

(87) PCT Pub. No.: WO2010/079893
PCT Pub. Date: Jul. 15, 2010

(65) Prior Publication Data
US 2011/0267423 A1 Nov. 3, 2011

Related U.S. Application Data

(60) Provisional application No. 61/142,640, filed on Jan. 6, 2009.

(51) Int. Cl.
*H04N 5/225* (2006.01)
*H04N 13/02* (2006.01)
(Continued)

(52) U.S. Cl.
CPC .......... *H04N 13/0059* (2013.01); *H04N 5/232* (2013.01); *H04N 19/597* (2014.11);
(Continued)

(58) Field of Classification Search
CPC .............................. H04N 7/50; H04N 7/26351
USPC ................... 375/240.01; 348/42, 51; 725/118
See application file for complete search history.

(56) References Cited

U.S. PATENT DOCUMENTS

2004/0120396 A1* 6/2004 Yun et al. ................. 375/240.01
2008/0244678 A1* 10/2008 Kim et al. ..................... 725/118

FOREIGN PATENT DOCUMENTS

CN 1613263 A 5/2005
CN 1954606 A 4/2007
(Continued)

OTHER PUBLICATIONS

Ho et al. "Overview of Multi-view Video Coding", 2007 IWSSIP & EC-SIPMCS, Slovenia.*
(Continued)

*Primary Examiner* — Jay Patel
*Assistant Examiner* — Frank Huang
(74) *Attorney, Agent, or Firm* — Dentons US LLP

(57) ABSTRACT

A method for processing a 3D video signal and a digital broadcast receiver for performing the method are disclosed. The method for processing a 3D video signal includes receiving a digital broadcast signal including a multiple hierarchy descriptor, identifying at least one of a second dependent Elementary Stream (ES) based on a first field included in the multiple hierarchy descriptor, wherein the second dependent ES is to be accessed before decoding of a first dependent ES, identifying signaling information of the second dependent ES based on a second field included in the multiple hierarchy descriptor, decoding the first dependent ES and the second dependent ES, and outputting a three dimensional (3D) video signal by formatting the decoded first and second dependent ESs.

12 Claims, 9 Drawing Sheets

(51) Int. Cl.
- *H04N 13/00* (2006.01)
- *H04N 5/232* (2006.01)
- *H04N 21/218* (2011.01)
- *H04N 21/235* (2011.01)
- *H04N 21/434* (2011.01)
- *H04N 21/435* (2011.01)
- *H04N 21/44* (2011.01)
- *H04N 21/81* (2011.01)
- *H04N 19/597* (2014.01)

(52) U.S. Cl.
CPC ....... *H04N21/21805* (2013.01); *H04N 21/235* (2013.01); *H04N 21/435* (2013.01); *H04N 21/4345* (2013.01); *H04N 21/44* (2013.01); *H04N 21/816* (2013.01)

(56) References Cited

FOREIGN PATENT DOCUMENTS

| | | |
|---|---|---|
| CN | 101282471 A | 10/2008 |
| WO | WO 2005/114998 A1 | 12/2005 |
| WO | WO 2007/064159 A1 | 6/2007 |

OTHER PUBLICATIONS

MPEG (http://web.archive.org/web/20081218210256/ http://en.wikipedia.org/wiki/MPEG-1, accessed Dec. 18, 2008.*

Yo-Sung Ho and Kwan-Jung Oh, "Overview of Multi-view Video Coding," Gwangju Institute of Science and Technology (GIST), Dec. 31, 2007, 5-12.

* cited by examiner

Fig. 1

| Syntax | No. of bits | Mnemonics |
|---|---|---|
| multiple_hierarchy_descriptorA ( ) { | | |
|   descriptor_tag | 8 | uimsbf |
|   descriptor_length | 8 | uimsbf |
|   reserved | 4 | bslbf |
|   hierarchy_type | 4 | uimsbf |
|   reserved | 2 | bslbf |
|   hierarchy_layer_index | 6 | uimsbf |
|   reserved | 2 | bslbf |
|   num_references | 6 | uimsbf |
|   for( j=0; j<num_references; j++ ) { | | |
|     reserved | 1 | bslbf |
|     same_channel_flag | 1 | bslbf |
|     hierarchy_embedded_layer_index | 6 | uimsbf |
|     if (same_channel_flag=='0') { | | |
|       hierarchy_embedded_layer_channel_info( ) | | |
|     } | | |
|   } | | |
| } | | |

Fig. 2

| Syntax | No. of bits | Mnemonics |
|---|---|---|
| multiple_hierarchy_descriptorB ( ) { | | |
|   descriptor_tag | 8 | uimsbf |
|   descriptor_length | 8 | uimsbf |
|   reserved | 3 | bslbf |
|   PCR_PID | 13 | uimsbf |
|   num_components | 8 | uimsbf |
|   for( j=0; j<num_components; j++ ) { | | |
|     stream_type | 8 | uimsbf |
|     reserved | 3 | bslbf |
|     elementary_PID | 13 | uimsbf |
|     reserved | 4 | bslbf |
|     hierarchy_type | 4 | uimsbf |
|     reserved | 2 | bslbf |
|     hierarchy_layer_index | 6 | uimsbf |
|     reserved | 2 | bslbf |
|     num_references | 6 | uimsbf |
|     for( k=0; k<num_references; k++ ) { | | |
|       reserved | 1 | bslbf |
|       same_channel_flag | 1 | bslbf |
|       hierarchy_embedded_layer_index | 6 | uimsbf |
|       if (same_channel_flag=='0') | | |
|         hierarchy_embedded_layer_channel_info( ) | | |
|     } | | |
|   } | | |
| } | | |

Fig. 3

| Syntax | No. of bits | Mnemonic |
|---|---|---|
| hierarchy_embedded_layer_channel_info ( ) { | | |
|    major_channel_number | 10 | uimsbf |
|    minor_channel_number | 10 | uimsbf |
|    transmission_mode | 8 | bslbf |
|    carrier_frequency | 32 | uimsbf |
|    channel_TSID | 16 | bslbf |
|    program_number | 16 | uimsbf |
|    source_id | 16 | bslbf |
|    if (transmission_mode != simulcast) | | |
|       hierarchy_program_start_time | 32 | |
| } | | |

Fig. 6

| Syntax | No. of Bits | Format |
|---|---|---|
| terrestrial_virtual_channel_table_section() { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for (i=0; i<num_channels_in_section; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i<N; i++) { | | |
|       descriptor() | | |
|     } | | |
|   } | | |
|   reserved | 6 | '111111' |
|   additional_descriptors_length | 10 | uimsbf |
|   for (j=0; j<N; j++) { | | |
|     additional_descriptor() | | |
|   } | | |
|   CRC_32 | 32 | rpchof |
| } | | | num_channels_in_section loop : i=0 (channel num : 12-1)

| | |
|---|---|
| major_channel_number | 12 |
| minor_channel_number | 1 |
| service_type | 0x02 | multiple_hierarchy_descriptor loop

| | |
|---|---|
| num_components | 8 |

(a)
num_components loop : j=0 (S0)

| | |
|---|---|
| stream_type | 0x1B (AVC/H.264) |
| elementary_PID | 0x0500 |
| hierarchy_type | 15 (Base layer) |
| hierarchy_layer_index | 0 |
| num_references | 0 |

(b)
num_components loop : j=1 (S1)

| | |
|---|---|
| stream_type | 0x20 (MVC) |
| elementary_PID | 0x0501 |
| hierarchy_type | 7 (Multi-view Profile) |
| hierarchy_layer_index | 1 |
| num_references | 2 |
| num_references loop : k=0 | |
| same_channel_flag | 1 |
| hierarchy_embedded_layer_index | 0 |
| num_references loop : k=1 | |
| same_channel_flag | 1 |
| hierarchy_embedded_layer_index | 2 |

...

(c)
num_components loop : j=7 (S7)

| | |
|---|---|
| stream_type | 0x20 (MVC) |
| elementary_PID | 0x0507 |
| hierarchy_type | 7 (Multi-view Profile) |
| hierarchy_layer_index | 7 |
| num_references | 1 |
| num_references loop : k=0 | |
| same_channel_flag | 1 |
| hierarchy_embedded_layer_index | 6 |

METHOD FOR PROCESSING THREE DIMENSIONAL (3D) VIDEO SIGNAL AND DIGITAL BROADCAST RECEIVER FOR PERFORMING THE METHOD

This application is a 35 U.S.C. §371 National Stage entry of International Application No. PCT/KR2009/007213, filed on Dec. 4, 2009, and claims priority to U.S. Provisional Application No. 61/142,640, filed Jan. 6, 2009, both of which is hereby incorporated by reference in its entirety as if fully set forth herein.

TECHNICAL FIELD

The present invention relates to three dimensional (3D) broadcasting, and more particularly to a method for processing a 3D video signal and a digital broadcast receiver for performing the method.

BACKGROUND ART

Generally, a three dimensional (3D) image (or a stereoscopic image) provides user's eyes with a stereoscopic effect using the stereoscopic visual principle. A human being feels both near and far through a binocular parallax caused by a distance between their eyes spaced apart from each other by about 65 mm, such that the 3D image enables both right and left eyes to respectively view their associated planar images, and a human brain merges two different images with each other, resulting in a sense of depth and a sense of presence in the 3D image.

The above-mentioned 3D image display method may be classified into a stereoscopic scheme, a volumetric scheme, a holographic scheme, etc. In addition, a 3D image display device adds depth information to two dimensional (2D) images or uses left view image information and right view image information, such that a user of the 3D image display device can feel a sense of vividness and a sense of reality in a 3D image.

In addition, a method for allowing the user to view the 3D image may be exemplarily classified into one method for providing the user with polarization glasses and another method for providing the user with no polarization glasses.

A television according to the related art has been designed to display only a 2D image. In contrast, many developers and companies have recently conducted intensive research into a 3D imaging technology for use in a digital broadcasting field. However, detailed protocols related to a 3D broadcast signal processing technology have not been defined yet, so that broadcast content providers, broadcast stations, and DTV manufacturers have been thrown into a great confusion of such 3D broadcast signal processing.

DISCLOSURE OF INVENTION

Technical Problem

Accordingly, the present invention is directed to a method for processing a three dimensional (3D) video signal and a digital broadcast receiver for performing the method, that substantially obviate one or more problems due to limitations and disadvantages of the related art.

An object of the present invention is to provide a new protocol capable of processing a 3D broadcast signal.

Another object of the present invention is to defines how one view refers to a plurality of views in an operation for processing a 3D broadcast signal.

A further object of the present invention is to provide a method for processing a necessary (needed) Elementary Stream (ES) according to a set-up of a broadcast receiver, thereby increasing a decoding speed of a 3D video signal.

Solution to Problem

The object of the present invention can be achieved by providing a method for processing a three dimensional (3D) video signal including receiving a digital broadcast signal including a multiple hierarchy descriptor, identifying at least one of a second dependent Elementary Stream (ES) based on a first field included in the multiple hierarchy descriptor, wherein the second dependent ES is to be accessed before decoding of a first dependent ES, identifying signaling information of the second dependent ES based on a second field included in the multiple hierarchy descriptor, decoding the first dependent ES and the second dependent ES, and outputting a three dimensional (3D) video signal by formatting the decoded first and second dependent ESs.

In another aspect of the present invention, provided herein is a digital broadcast receiver for processing a three dimensional (3D) video signal, the digital broadcast receiver including a tuner configured to receive a digital broadcast signal including a multiple hierarchy descriptor, a Program Specific Information (PSI)/Program and System Information Protocol (PSIP) processor configured to identify at least one of a second dependent Elementary Stream (ES) based on a first field included in the multiple hierarchy descriptor, and identify signaling information of the second dependent ES based on a second field included in the multiple hierarchy descriptor, wherein the second dependent ES is to be accessed before decoding of a first dependent ES, a decoder configured to decode the first dependent ES and the second dependent ES, and an output formatter configured to output a three dimensional (3D) video signal by formatting the decoded first and second dependent ESs.

Advantageous Effects of Invention

One embodiment of the present invention provides a new protocol capable of processing a 3D broadcast signal.

Another embodiment of the present invention defines how one view refers to a plurality of views in an operation for processing a 3D broadcast signal.

Another embodiment of the present invention provides a method for processing a necessary (needed) Elementary Stream (ES) according to a set-up of a broadcast receiver, thereby increasing a decoding speed of a 3D video signal.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 1 is a diagram illustrating a multiple hierarchy descriptor according to one embodiment of the present invention.

FIG. 2 is a diagram illustrating a multiple hierarchy descriptor according to another embodiment of the present invention.

FIG. 3 is a diagram illustrating signaling information included in the multiple hierarchy descriptor shown in FIG. 1 or FIG. 2.

FIG. 6 shows a Virtual Channel Table (VCT) including the multiple hierarchy descriptor shown FIG. 2.

BEST MODE FOR CARRYING OUT THE INVENTION

Figure 4:
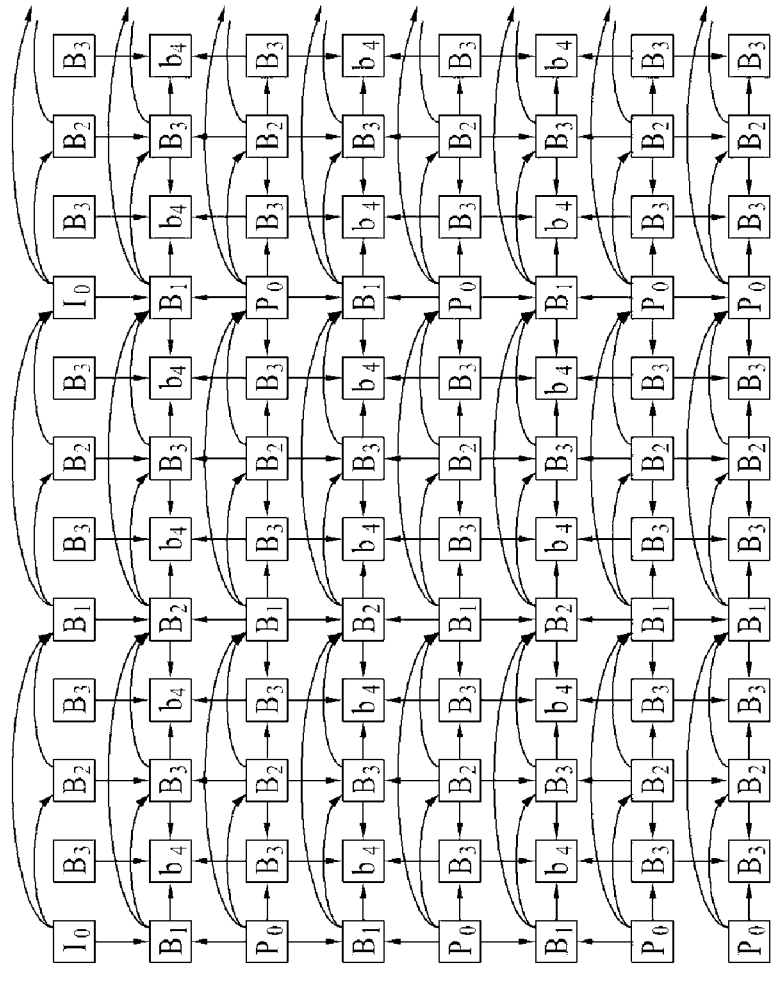
FIG. 4 is a diagram illustrating the relationship of dependency among several views constituting a 3D video signal.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Prior to describing the present invention, it should be noted that most terms disclosed in the present invention are defined in consideration of functions of the present invention and correspond to general terms well known in the art, and can be differently determined according to intention of those skilled in the art, usual practices, or introduction of new technologies. In some cases, a few terms have been selected by the applicant as necessary and will hereinafter be disclosed in the following description of the present invention. Therefore, it is preferable that the terms defined by the applicant be understood on the basis of their meanings in the present invention.

In accordance with the following embodiments of the present invention, information capable of processing a 3D video signal is contained in system information, so that the resultant system information including the information is then transmitted to a desired destination. The system information may also be called service information. For example, the system information includes channel information, program information, event information, etc. In accordance with the embodiments of the present invention, the system information may be newly added to a Program Specific Information/Program and System Information Protocol (PSI/PSIP) as necessary. However, the scope and spirit of the present invention are not limited to the above-mentioned examples. If it is assumed that there is a protocol capable of transmitting the system information in the form of a table format, the scope and spirit of the present invention can also be applied to other examples irrespective of titles of the system information.

The PSI is disclosed only for illustrative purposes and better understanding of the present invention. The PSI may include a Program Association Table (PAT), a Conditional Access Table (CAT), a Program Map Table (PMT), a Network Information Table (NIT), etc.

The PAT corresponds to specific information which is transmitted by a packet having a PID of '0'. The PAT transmits PID information of the PMT and PID information of the NIT of each program. The CAT transmits information of a pay broadcast service used in the broadcast transmission system. The PMT transmits a program identification number, packet identifier (PID) information of a transport stream packet, in which individual bit streams of video and audio data constituting a program are transmitted, and PID information, in which a PCT is transmitted. The NIT transmits information of an actual transmission network. For example, PID information of a program number and the PMT may be acquired by parsing the PAT having a PID of '0'. In addition, in the case where the PMT acquired from the PAT is parsed, information about correlation among constituent elements of a program is acquired.

The PSIP may include, for example, a Virtual Channel Table (VCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), a Master Guide Table (MGT), and the like.

The VCT transmits information about a virtual channel, for example, channel information for selecting a channel and information about a packet identifier (PID) for receiving audio and/or video data. That is, when the VCT is parsed, a channel name, a channel number, and the PID of the audio and video data of a broadcast program carried in the channel can be known. The STT transmits current date and time information, and the RRT transmits information about a region and an organ of consultation for a program rating level. The ETT transmits an additional description about a channel and a broadcast program, and the EIT transmits information about an event of a virtual channel. The DCCT/DCCSCT transmits information about an automatic channel change, and the MGT transmits version and PID of individual tables contained in the PSIP.

The related art has assumed that all elements constituting a multiple view stream are connected to a single table, and then transmitted. For example, in order to implement a digital broadcast receiver for receiving and processing a 3D video signal using a Multiple View Video Coding (MVC) technology, a specific view should refer to one or more other views.

However, the related art has performed signaling of only a program element provided over a corresponding channel when constructing an information table of a specific channel. Therefore, a 'hierarchy_channel' field becomes a redundant information if the 'hierarchy_channel' field is defined in PMT or a VCT, because a channel information and a descriptor are interoperable with each other. However, when a program element identified by a 'hierarchy_embedded_layer_index' field is provided over a different channel, there is a need to provide information about the different channel.

The 'hierarchy_channel' field according to the related art has a disadvantage in that there is insufficient amount of information to search for a stream transmitted to another channel in an actual broadcast application, so that the present invention aims to provide a method for solving the above-mentioned problem.

FIG. 1 is a diagram illustrating a multiple hierarchy descriptor according to one embodiment of the present invention. In FIG. 1, it is assumed that the multiple hierarchy descriptor according to one embodiment of the present invention is located in a PMT for convenience of description and better understanding of the present invention.

A 'hierarchy_type' field defines a hierarchical relation between an associated hierarchy layer and its hierarchy embedded layer.

A 'hierarchy_layer_index' field is a 6-bit field that defines a unique index of associated program elements in a table of coding layer hierarchies. Indices shall be unique within a single program definition.

Specifically, in accordance with one embodiment of the present invention, in order to process a 3D video broadcast signal, a 'num_references' field, a 'same_channel_flag' field, and a 'hierarchy_embedded_layer_channel_info( )' field are added to the multiple hierarchy descriptor. In addition, in accordance with another embodiment of the present invention, a 'hierarchy_embedded_layer_index' field may be further added to the multiple hierarchy descriptor, or a function of the 'hierarchy_embedded_layer_index' field may be newly defined.

The 'num_references' field may identify the number of one or more dependent elementary streams (ESs), wherein the dependent ESs are to be accessed in order to decoding elementary stream associated with a current multiple hierarchy descriptor. Moreover, a program is a collection of program elements. In addition, the program elements may be elementary streams (ESs).

The 'same_channel_flag' field may identify whether the dependent ES can be received over the same channel as a transmission channel of the multiple hierarchy descriptor.

The 'hierarchy_embedded_layer_index' field is a 6-bit field that defines a hierarchy table index of a program element that needs to be accessed before decoding of the elementary stream associated with this multiple hierarchy descriptor. This field is undefined in the case where the 'hierarchy_type' value corresponds to a base layer.

In addition, in the case where a value of the 'same_channel_flag' field means that the dependent ES is received over a different channel (for example, "same_channel_flag"='0'), signaling information capable of receiving the dependent elementary stream (ES) transmitted over a different channel is defined in the 'hierarchy_embedded_layer_channel_info( )' field.

The 'hierarchy_embedded_layer_channel_info( )' field may include signaling information of program elements referred to as the 'hierarchy_embedded_layer_index' field.

The 'hierarchy_embedded_layer_channel_info( )' field will hereinafter be described with reference to FIG. 3.

For example, there may arise an exemplary case for referring to at least one another view in a process for decoding one camera view according to the MVC technology. In accordance with one embodiment of the present invention, as shown in FIG. 1, dependency among several elementary streams (ESs) or views constituting a 3D video signal is accurately defined, so that it is possible to easily provide a 3D broadcast service under a digital broadcast environment.

FIG. 2 is a diagram illustrating a multiple hierarchy descriptor according to another embodiment of the present invention. In FIG. 2, it is assumed that a multiple hierarchy descriptor according to another embodiment of the present invention is located in a VCT for convenience of description and better understanding of the present invention.

In FIG. 2, a 'num_references' field, a 'same_channel_flag' field, a 'hierarchy_embedded_layer_index' field, and a 'hierarchy_embedded_layer_channel_info( )' field have the same functions as those of FIG. 1.

However, in the case where a multiple hierarchy descriptor is added to the VCT, there is a need for the VCT to include specific information capable of matching PID information of elementary streams (program elements) contained in the multiple view stream transmitted over a specific virtual channel with the 'hierarchy_layer_index' field.

Therefore, a 'stream_type' field and an 'elementary_PID' field are further added to the multiple hierarchy descriptor shown in FIG. 2 in a different way from FIG. 1.

A 'PCR_PID' field is a 13-bit field indicating the PID of Transport Stream (TS) packets which shall contain a PCR field valid for a program specified by a 'program_number' field.

A 'num_components' field indicates the number of program elements constituting a multiple view stream capable of being received over a current channel.

A 'stream_type' field is an 8-bit field specifying the type of a program element carried within packets with the PID whose value is specified by an 'elementary_PID' field.

An 'elementary_PID' field is a 13-bit field specifying the PID of Transport Stream (TS) packets which carry an associated program element.

The above-mentioned 'hierarchy_embedded_layer_channel_info( )' field will hereinafter be described with reference to FIG. 3.

FIG. 3 is a diagram illustrating signaling information included in the multiple hierarchy descriptor shown in FIG. 1 or FIG. 2. The 'hierarchy_embedded_layer_channel_info( )' field shown in FIG. 1 or FIG. 2 will hereinafter be described with reference to FIG. 3.

When a hierarchical dependent stream is transmitted over a channel different from a transmission channel of a current multiple hierarchy descriptor, the 'hierarchy_embedded_layer_channel_info( )' field according to one embodiment of the present invention includes signaling information capable of receiving the dependent stream.

The hierarchical dependent stream may correspond to an elementary stream (ES) of a different view that is referenced by a given view constituting a 3D video signal. For example, the given view may correspond to a first dependent elementary stream (ES), and the different view may correspond to at least one of a second dependent ES that should be referenced by the first dependent ES. Therefore, specific information capable of searching for a corresponding channel via which the hierarchical dependent stream is transmitted is obtained using fields shown in FIG. 3, i.e., a 'major_channel_number' field, a 'minor_channel_number' field, a 'transmission_mode' field, a 'carrier_frequency' field, a 'channel_TSID' field, a 'program_number' field, and a 'source_id' field.

The 'major_channel_number' field may correspond to a 10-bit number that represents the 'major' channel number associated with the virtual channel being defined in this iteration of the 'for' loop.

The 'minor_channel_number' field may correspond to a 10-bit number in the range from '0' to '999' so as to represent the 'minor' or 'sub' channel number.

The 'carrier_frequency' field may correspond to 32 bits. The recommended value for these 32 bits is zero.

The 'channel_TSID' field may correspond to a 16-bit unsigned integer field in the range from 0x0000 to 0xFFFF so as to represent the MPEG-2 Transport Stream ID associated with the Transport Stream (TS) carrying the MPEG-2 Program referenced by this virtual channel.

The 'program_number' field may correspond to a 16-bit unsigned integer number that associates the virtual channel being defined here with the MPEG-2 program association and TS program map tables.

The 'source_id' field may correspond to a 16-bit unsigned integer number that identifies the programming source associated with the virtual channel.

Further, the 'transmission_mode' field may identify a service method of the hierarchical dependent stream.

For example, the 'transmission_mode' field may identify a 'simultaneous broadcast' (simulcast) mode, a 'non real-time transmission' mode, a 'real time with shift' mode, and the like.

If a current mode is determined to be the 'simultaneous broadcast' (simulcast) mode, an ES of a given view constituting a 3D video signal and an ES of a different view referenced by the given view can be simultaneously received.

On the other hand, in the case where a current mode is not equal to the 'simultaneous broadcast' (simulcast) mode, i.e., in the case where a current mode is determined to be the 'non real-time transmission' mode or the 'real time with shift' mode, the digital broadcast receiver according to one embodiment of the present invention can receive either elementary streams (ESs) or program elements of other views referenced by the above-mentioned view from a time defined in the 'hierarchy_program_start_time' field. In addition, the digital broadcast receiver receives and stores the first dependent ES until a current time reaches the time defined in the 'hierarchy_program_start_time' field. In the case where the current time reaches the defined time, a second dependent ES to be accessed to decode the first dependent ES is decoded along with the stored first dependent ES.

FIG. 4 is a diagram illustrating the relationship of dependency among several views constituting a 3D video signal. The dependency relationship among times and views of a 3D video signal composed of 8 views will hereinafter be described with reference to FIG. 4.

Referring to FIG. 4, a stream Sn means an n-th stream, and a 'hierarchy_layer_index' value of a multiple hierarchy descriptor associated with the n-th stream becomes 'n'.

A stream S0 may correspond to a base Elementary Stream (ES). The base ES indicates a stream that need not refer to another ES in a video decoding process. Further, the base ES may also be called an independent ES as necessary.

In association with the stream S1, the 'num_references' field may be set to a value of '2', and the 'hierarchy_embedded_layer_index' field may be set to values of '0' and '2'

For example, in the case where a digital television (DTV) for receiving a 3D video signal can perform a stereoscopic display function, and the streams S0 and S1 are selected by a user's input signal or the like, only the streams S0, S1 and S2 are decoded using the multiple hierarchy descriptor, and there is no need to decode the remaining streams other than the streams S0, S1 and S2.

In more detail, the stream S0 does not refer to other streams, the stream S1 refers to the streams S0 and S2, and the stream S2 refers to only the stream S0, such that there is a need to decode only the streams S0, S1 and S2.

In accordance with one embodiment of the present invention, the decoding process is omitted from unnecessary streams (for example, streams S3 to S7 in the above description), so that the efficiency of the decoding process is increased and the speed thereof is also improved.

Figure 5:
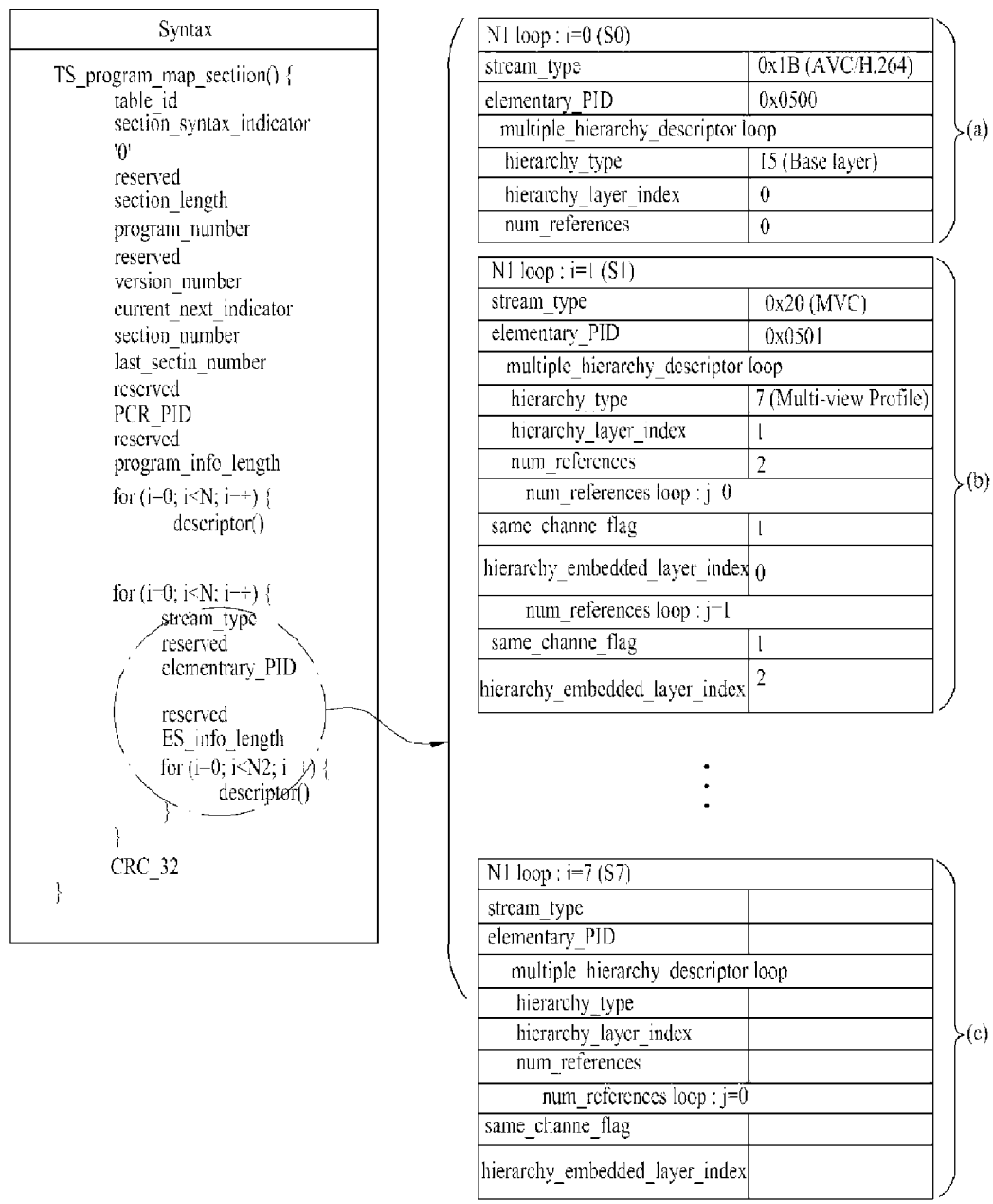
FIG. 5 shows a Program Map Table (PMT) including the multiple hierarchy descriptor shown in FIG. 1.

FIG. 5 shows a Program Map Table (PMT) including the multiple hierarchy descriptor shown in FIG. 1. An example in which the PMT includes the multiple hierarchy descriptor will hereinafter be described with reference to FIG. 5.

FIG. 5(a) means an elementary stream S0 that need not refer to other elementary streams (ESs). FIG. 5(b) means an elementary stream 51 that needs to refer to two different elementary streams (ESs) S0 and S2. FIG. 5(c) means an elementary stream S7 that needs to refer to a single different stream S6.

As previously stated in FIG. 4, the stream S0 corresponds to a base elementary stream (ES), and the base ES means a stream that need not refer to another ES in a video decoding process. Furthermore, the base ES may also be called an independent ES as necessary.

A brief description of fields shown in FIG. 5 is as follows.

A 'table_id' field is an 8-bit field which shall be always set to '0x02' in a 'TS_program_map_section' field.

A 'section_syntax_indicator' field is a 1-bit field which shall be set to '1'.

A 'section_length' field is a 12-bit field in which first two bits shall be set to '00'.

The remaining 10 bits may specify the number of bytes of the section starting immediately following the 'section_length' field, and including the CRC. The value in this field shall not exceed '1021' (0x3FD).

A 'program_number' field is a 16-bit field. It specifies the program to which the 'program_map_PID' field is applicable. One program definition shall be carried within only one 'TS_program_map_section' field. This implies that a program definition is never longer than '1016' (0x3F8). For example, the 'program_number' field may be used as a designation for a broadcast channel. By describing the different program elements belonging to a program, data from different sources (e.g. sequential events) can be concatenated together to form a continuous set of streams using a 'program_number' field.

A 'version_number' field is the version number of the 'TS_program_map_section' field. The version number shall be incremented by 1 modulo 32 when a change in the information carried within the section occurs. The version number refers to the definition of a single program, and therefore to a single section. When the 'current_next_indicator' field is set to '1', then the 'version_number' field shall be that of the currently applicable 'TS_program_map_section' field. When the 'current_next_indicator' field is set to '0', then the 'version_number' field shall be that of the next applicable 'TS_program_map_section' field.

A 'current_next_indicator' field may be set to '1', which indicates that the transmitted 'TS_program_map_section' field is currently applicable. When a bit of the 'current_next_indicator' field is set to '0', the bit of '0' indicates that the transmitted 'TS_program_map_section' field is not yet applicable and shall be the next 'TS_program_map_section' field to become valid.

The value of the 'section_number' field shall be '0x00'.

The value of the 'last_section_number' field shall be '0x00'.

A 'PCR_PID' field is a 13-bit field indicating the PID of the Transport Stream (TS) packets which shall contain the PCR fields valid for the program specified by a 'program_number' field. in the case where no PCR is associated with a program definition for private streams, then this field shall take the value of '0x1FFF'.

A 'program_info_length' field is a 12-bit field, the first two bits of which shall be '00'. The remaining 10 bits may specify the number of bytes of descriptors immediately following the 'program_info_length' field.

A 'stream_type' field is an 8-bit field specifying the type of a program element carried within packets with the PID whose value is specified by the 'elementary_PID' field.

An 'elementary_PID' field is a 13-bit field specifying a PID of the Transport Stream (TS) packets which carry the associated program element.

An 'ES_info_length' field is a 12-bit field, the first two bits of which shall be '00'. The remaining 10 bits may specify the number of bytes of descriptors of the associated program element immediately following the 'ES_info_length' field.

A 'CRC_32' field is a 32-bit field which contains a CRC value that gives a zero output of registers in the decoder.

FIG. 6 shows a Virtual Channel Table (VCT) including the multiple hierarchy descriptor shown FIG. 2. An example in which the VCT includes a multiple hierarchy descriptor will hereinafter be described with reference to FIG. 6.

FIG. 6(a) means an elementary stream S0 that need not refer to other elementary streams (ESs). FIG. 6(b) means an elementary stream S1 that needs to refer to two different elementary streams (ESs) S0 and S2. FIG. 6(c) means an elementary stream S7 that needs to refer to a single different stream S6.

As previously stated in FIG. 4, the stream S0 corresponds to a base elementary stream (ES), and the base ES means a stream that need not refer to another ES in a video decoding process. Furthermore, the base ES may also be called an independent ES as necessary.

A brief description of fields shown in FIG. 6 is as follows.

A value of a 'table_id' field indicates the type of a table section being defined here. For a 'terrestrial_virtual_channel_table_section( )' field, the 'table_id' field shall be set to '0xC8'.

A 'section_syntax_indicator' field is a one-bit field which shall be set to '1' for the 'terrestrial_virtual_channel_table_section( )' field.

A 'private_indicator' field shall be set to '1'.

A 'section_length' field is a 12-bit field in which the first two bits shall be set to '00'. It specifies the number of bytes of the section, starting immediately following the 'section_length' field, and including the CRC. The value in this field shall not exceed '1021'.

A 'transport_stream_id' field indicates the 16-bit MPEG-2 Transport Stream (TS) ID, as it appears in the Program Association Table (PAT) identified by a PID value of zero for this multiplex. The 'transport_stream_id' field distinguishes a Terrestrial Virtual Channel Table (TVCT) from others that may be broadcast in different PTCs.

A 'version_number' field is a version number of the Virtual Channel Table (VCT). For the current VCT (current_next_indicator='1'), the version number shall be incremented by 1 whenever the definition of the current VCT changes. Upon reaching the value of 31, it wraps around to zero '0'. For the next VCT (current_next_indicator='0'), the version number shall be one unit more than that of the current VCT (also in modulo 32 arithmetic). In any case, the value of the 'version_number' field shall be identical to that of the corresponding entries in a Master Guide Table (MGT)

A 'current_next_indicator' field is a one-bit indicator. in the case where the 'current_next_indicator' field is set to '1', this means that a transmitted Virtual Channel Table (VCT) is currently applicable. When a bit of the 'current_next_indicator' field is set to '0', this means that the transmitted table is not yet applicable and shall be the next table to become valid. This standard imposes no requirement that 'next' tables (those with the 'current_next_indicator' field set to '0') must be sent. An update to the currently applicable table shall be signaled by incrementing the 'version_number' field.

A 'section_number' field gives the number of this section. The 'section_number' field of the first section in the Terrestrial Virtual Channel Table (TVCT) shall be set to '0x00'. It shall be incremented by one with each additional section in the Terrestrial Virtual Channel Table (TCVT).

A 'last_section_number' field specifies the number of the last section (that is, the section with the highest section_number value) of the complete Terrestrial Virtual Channel Table.

A 'protocol_version' field is used to allow, in the future, the table type to carry parameters that may be structured differently than those defined in the current protocol. At present, only one value valid for the 'protocol_version' field is zero. Non-zero values of the 'protocol_version' field may be used by a future version of this standard to indicate structurally different tables.

A 'num_channels_in_section' field specifies the number of virtual channels in this VCT section. The number is limited by the section length.

A 'short_name' field specifies the name of the virtual channel.

A 'major_channel_number' field indicates a 10-bit number that represents the 'major' channel number associated with the virtual channel being defined in this iteration of the 'for' loop. Each virtual channel shall be associated with a major channel number and a minor channel number. Not only the major channel number but also the minor channel number acts as a user's reference number for the virtual channel. The 'major_channel_number' field shall be present between '1' and '99'. The value of 'major_channel_number' field shall be set such that there is no case in which a 'major_channel_number/minor_channel_number' pair is duplicated within the TVCT.

A 'minor_channel_number' field indicates a 10-bit number in the range from '0' to '999' so as to represent the 'minor' or 'sub' channel number. This 'minor_channel_number' field together with the 'major_channel_number' field may indicate a two-part channel number, where the 'minor_channel_number' field represents the second or right-hand part of the number. When the 'service_type' field is used to indicate an analog television, the 'minor_channel_number' field shall be set to zero '0'. Each service, a 'service_type' field of which is either an 'ATSC_digital_television' or an 'ATSC_audio_only', shall use any of minor numbers ranging from 1 to 99. The value of the 'minor_channel_number' field shall be set such that there is no case in which a 'major_channel_number/minor_channel_number' pair is duplicated within the TVCT. For other types of services, such as data broadcasting, valid minor virtual channel numbers are in the range from '1' to '999'.

A 'modulation_mode' field indicates a modulation mode for the transmitted carrier associated with the virtual channel.

A 'carrier_frequency' field is set to a value of zero. The 'carrier_frequency' field may be used to identify a carrier frequency, but the use of the 'carrier_frequency' field is deprecated.

A 'channel_TSID' field in the range from 0x0000 to 0xFFFF represents an MPEG-2 Transport Stream (TS) ID associated with the Transport Stream (TS) carrying the MPEG-2 program referenced by the virtual channel. For inactive channels, the 'channel_TSID' field shall represent an ID of the Transport Stream (TS) that will carry the service when it becomes active. It is expected that the receiver uses the 'channel_TSID' field to verify that any received Transport Stream (TS) is actually equal to the desired multiplex. For analog channels (service_type 0x01), the 'channel_TSID' field shall indicate a value of the analog TSID included in a VBI of an NTSC signal.

A 'program_number' field may associate the virtual channel being defined here with the MPEG-2 program association and TS program map tables.

For virtual channels representing analog services, a value of 0xFFFF shall be specified for a 'program_number' field.

An 'ETM_location' field specifies the existence and the location of an Extended Text Message (ETM).

An 'access_controlled' field indicates a 1-bit Boolean flag. When the Boolean flag of the 'access_controlled' field is set, this means that accessing the events associated with a virtual channel may be controlled. When the Boolean flag is set to '0', an event access is not restricted.

A 'hidden' field indicates a 1-bit Boolean flag. When the Boolean flag of the 'hidden' field is set, this means that the virtual channel is not accessed by a user by a direct entry of the virtual channel number. Hidden virtual channels are skipped when the user is channel-surfing, and appear as if undefined, if accessed by direct channel entry. Typical applications for hidden channels are test signals and NVOD services. Whether a hidden channel and its events may appear in EPG displays depends on the state of the 'hide_guide' bit.

A 'hide_guide' field indicates a Boolean flag. When the Boolean flag of the 'hide_guide' field is set to zero '0' for a hidden channel, this means that the virtual channel and its events may appear in EPG displays. This bit shall be ignored for channels which do not have the hidden bit set, so that non-hidden channels and their events may always be included in EPG displays regardless of the state of the 'hide_guide' bit. Typical applications for hidden channels with the 'hide_guide' bit set to '1' are test signals and services accessible through application-level pointers.

A 'service_type' field shall identify the type of service carried in the virtual channel.

A 'source_id field' identifies the programming source associated with the virtual channel. In this context, a source is one specific source of video, text, data, or audio programming. A source ID value of zero is reserved. Source ID values in the range from 0x0001 to 0x0FFF shall be unique within the Transport Stream (TS) that carries the VCT, while values 0x1000 to 0xFFFF shall be unique at the regional level. Values for source_ids 0x1000 and above shall be issued and administered by a Registration Authority (RA) designated by the ATSC.

A 'CRC_32' field contains a CRC value that ensures a zero output from the registers in the decoder.

In addition, the above-mentioned fields shown in FIGS. 5 and 6 may be interpreted by referring to the description of FIGS. 1 to 4.

Figure 7:
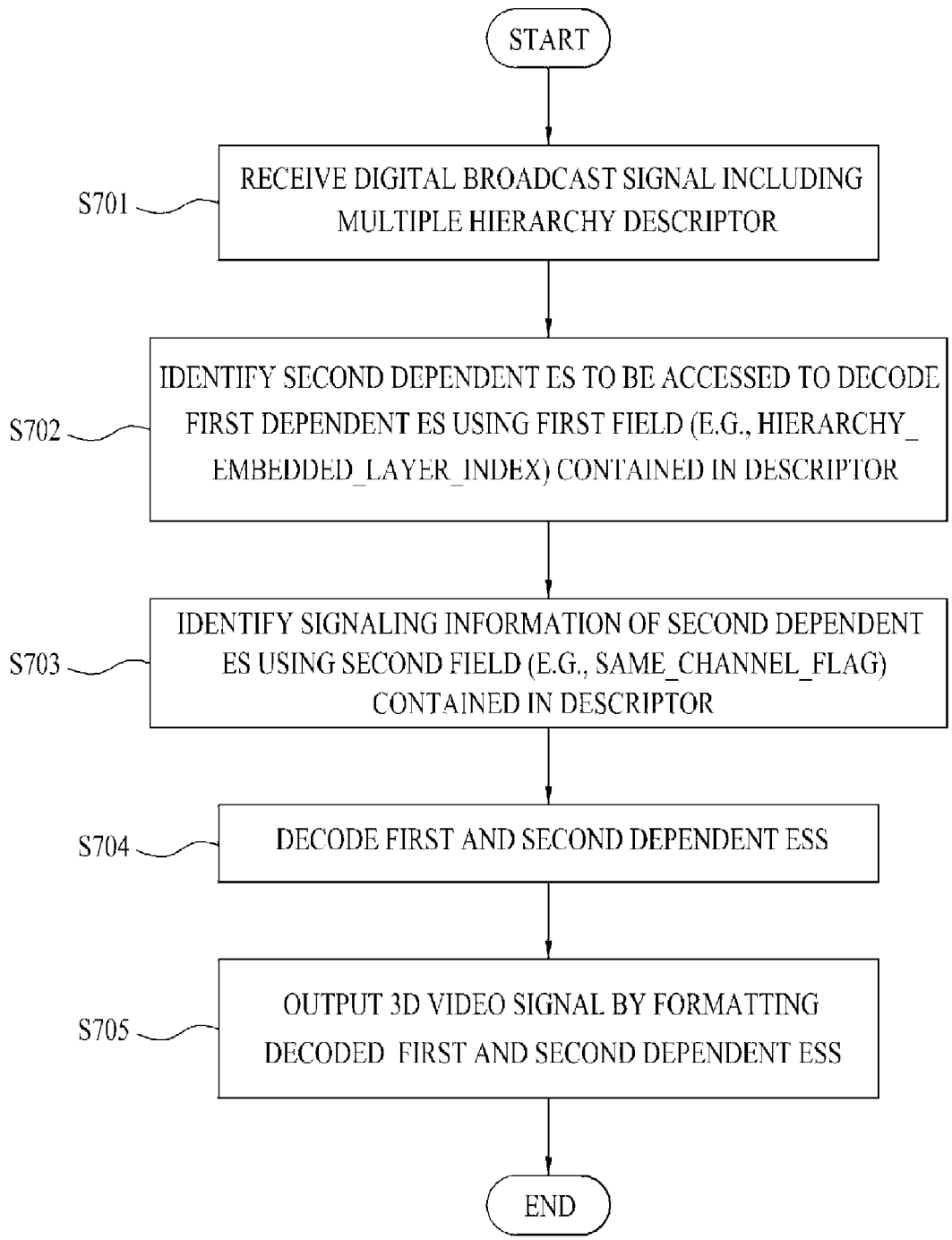
FIG. 7 is a flowchart illustrating a method for processing a 3D broadcast signal including a multiple hierarchy descriptor according to an embodiment of the present invention.

FIG. 7 is a flowchart illustrating a method for processing a 3D broadcast signal including a multiple hierarchy descriptor according to an embodiment of the present invention. A method for processing a 3D broadcast signal including a multiple hierarchy descriptor according to one embodiment of the present invention will hereinafter be described with reference to FIG. 7.

Referring to FIG. 7, a digital broadcast receiver for processing a 3D broadcast signal receives a digital broadcast signal including the multiple hierarchy descriptor at step S701. The multiple hierarchy descriptor may define the dependency among several ESs or views constituting a 3D video signal. In the case where the multiple hierarchy descriptor is located in the PMT, for example, a descriptor shown in FIG. 1 may be formed. In the case where the multiple hierarchy descriptor is located in the VCT, for example, a descriptor shown in FIG. 2 may be formed.

The digital broadcast receiver detects a first field contained in the multiple hierarchy descriptor, and identifies at least one of a second dependent ES to be accessed to decode a first dependent ES based on the first field at step S702. For example, the first field may correspond to the 'hierarchy_embedded_layer_index' field shown in FIG. 1 or FIG. 2.

The digital broadcast receiver may identify signaling information of the second dependent ES based on a second field contained in the multiple hierarchy descriptor at step S703. For example, the second field may correspond to the 'same_channel_flag' field shown in FIG. 1 or FIG. 2.

At step S704, the digital broadcast receiver may decode the first dependent ES, the second dependent ES, and the base ES using the above-mentioned identification result that has been acquired from step S703.

The digital broadcast receiver formats the decoded first dependent ES, the decoded second dependent ES, and the decoded base ES, such that it outputs a 3D video signal at step S705. For example, the base ES indicates an independent ES that need not refer to other ESs.

If there is a need to use the signaling information at step S703 (for example, if the second dependent ES is received over a channel different from a transmission channel of the multiple hierarchy descriptor at step S703), the digital broadcast receiver detects the signaling information. For example, the signaling information may include a transmission mode and a reception start time that are necessary (needed) for receiving the second dependent ES. Therefore, in the case where the transmission mode contained in the detected signaling information does not correspond to the simultaneous broadcast mode, the digital broadcast receiver receives the second dependent ES from the reception start time contained in the detected signaling information.

The above-mentioned case, in which the transmission mode does not correspond to the simultaneous broadcast mode, means for example, a non-real-time transmission mode or a real-time transmission mode with a time shift mode.

In addition, the signaling information may also be configured as a format including data shown in FIG. 3. Specifically, the signaling information may further include, for example, a transmission mode, and a start time at which the dependent ES can be received. For example, the transmission mode may correspond to the 'transmission_mode' field shown in FIG. 3, and the start time may correspond to the 'hierarchy_program_start_time' field shown in FIG. 3.

Accordingly, in the case where a value of the second field indicates a state that the second dependent ES is received over the different channel, the signaling information is detected. In addition, in the case where the transmission mode contained in the detected signaling information does not correspond to a simultaneous broadcast mode, the dependent ES is received from a start time contained in the detected signaling information.

Figure 8:
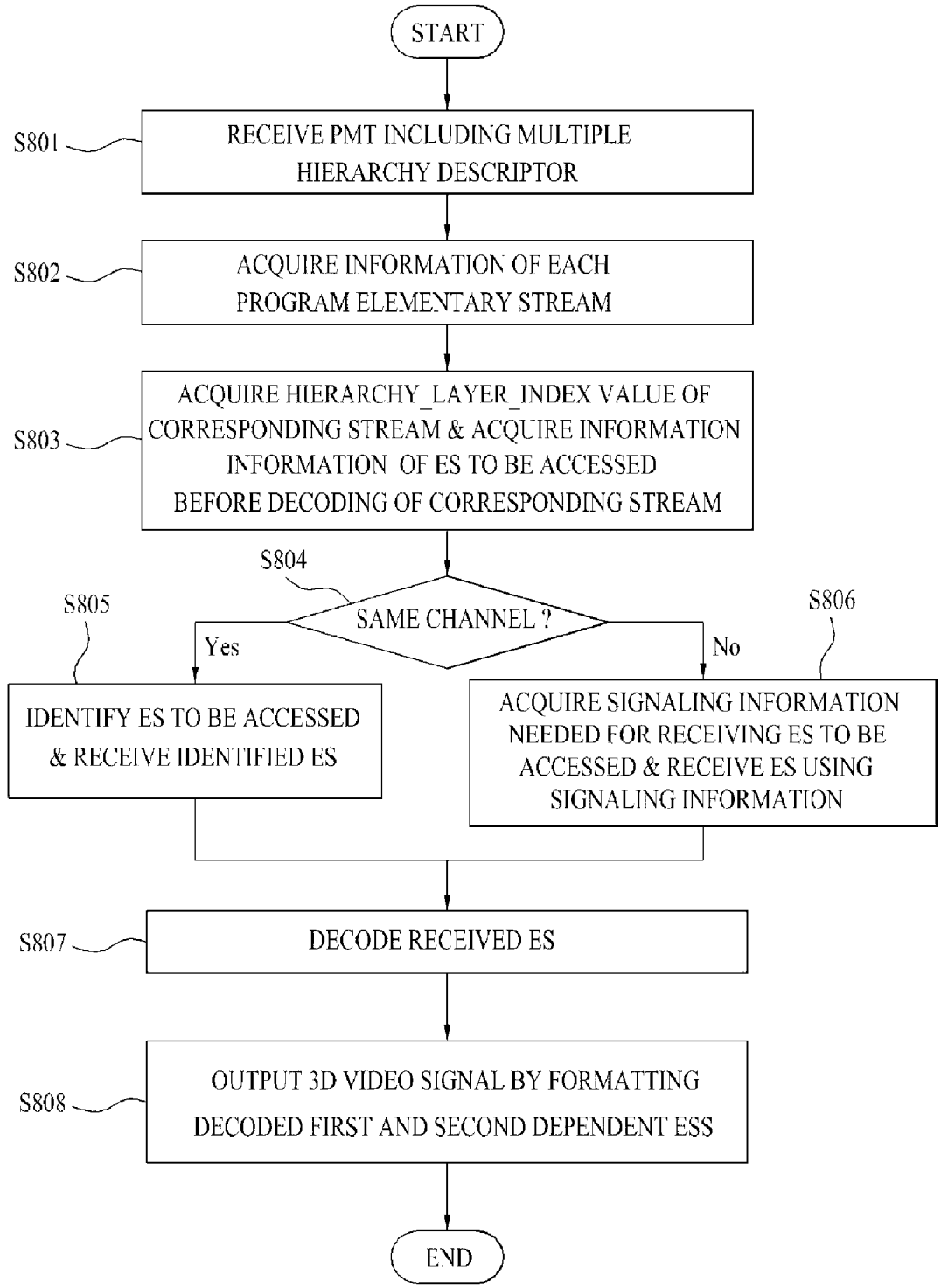
FIG. 8 is a flowchart illustrating a method for processing a PMT including the multiple hierarchy descriptor shown in FIG. 1.

FIG. 8 is a flowchart illustrating a method for processing a PMT including the multiple hierarchy descriptor shown in FIG. 1. A method for processing a 3D broadcast signal when the PMT includes the multiple hierarchy descriptor according to the embodiments of the present invention will hereinafter be described with reference to FIGS. 1, 5, and 8.

First, a digital broadcast receiver receives a PMT including the multiple hierarchy descriptor at step S801.

The digital broadcast receiver acquires information of each program element from the N1 loop shown in FIG. 5 at step S802.

The digital broadcast receiver acquires a value of the 'hierarchy_layer_index' field of a corresponding stream using not only the 'elementary_PID' field shown in FIG. 5 but also its associated descriptor, and then acquires information of a stream to be accessed before decoding of the corresponding stream at step S803. The stream to be accessed is exemplarily identified by a value of the 'hierarchy_embedded_layer_index' field.

The digital broadcast receiver may determine whether the dependent ES is received over the same channel as a transmission channel of a current descriptor using the 'same_channel_flag' field shown in FIG. 1 at step S804.

In the case where the dependent ES is transmitted over the same channel as the transmission channel of the current descriptor at step S804, the digital broadcast receiver identifies a stream corresponding to the 'hierarchy_embedded_layer_index' value using the 'elementary_PID' field associated with the descriptor including the 'hierarchy_layer_index' field, and then receives the identified stream at step S805. Furthermore, the digital broadcast receiver may extract a corresponding elementary stream (ES) using the value of the 'elementary_PID' field.

On the other hand, in the case where the dependent ES is transmitted over another channel at step S804, the digital broadcast receiver acquires signaling information (for example, channel information, a reception mode, or information of a reception available time, etc.) necessary (needed) for receiving a stream corresponding to the 'hierarchy_embedded_layer_index' value by means of data shown in FIG. 3, and then receives the stream using the above-mentioned signaling information at step S806.

Specific information, indicating whether a stream corresponding to the 'hierarchy_embedded_layer_index' value and a stream corresponding to the 'hierarchy_layer_index' value are transmitted over the same channel or different channels, is determined, for example, by the value of the 'same_channel_flag' field shown in FIG. 1.

The digital broadcast receiver decodes the first dependent ES identified by the 'hierarchy_layer_index' value, the second dependent ES identified by the 'hierarchy_embedded_layer_index' value, and the base ES at step S807. In the meantime, in accordance with one embodiment of the present invention, the digital broadcast receiver may acquire information necessary for setting up a channel using the 'program_number' field and the VCT.

The digital broadcast receiver formats the decoded first dependent ES, the decoded second dependent ES, and the decoded base ES according to setup information of the digital broadcast receiver, such that it outputs a 3D video signal at step S808. For example, the base ES means an independent ES that need not refer to another ES.

Therefore, in accordance with one embodiment of the present invention, not all elementary streams (ESs) are necessary to be decoded.

Figure 9:
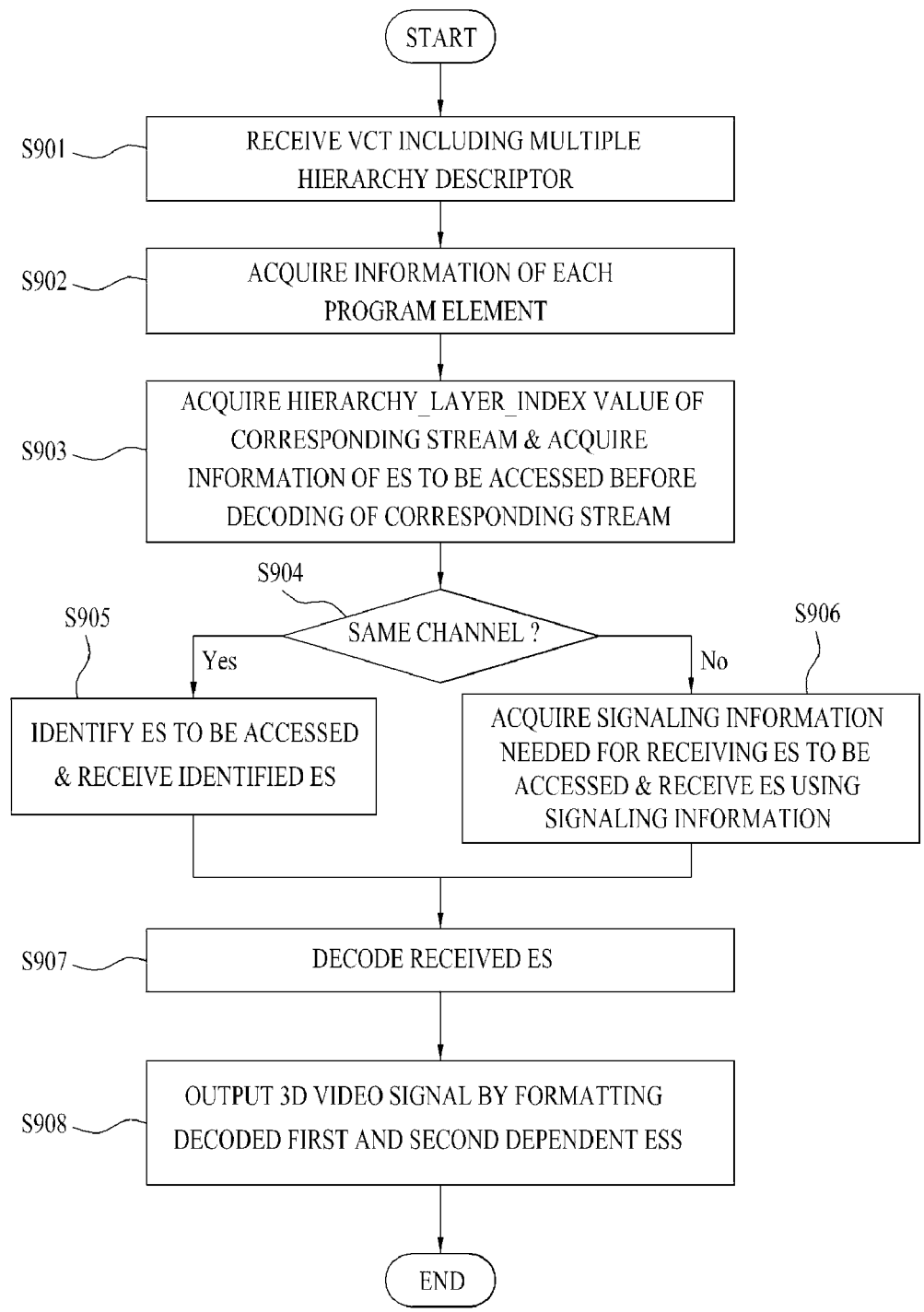
FIG. 9 is a flowchart illustrating a method for processing a VCT including the multiple hierarchy descriptor shown in FIG. 2.

FIG. 9 is a flowchart illustrating a method for processing a VCT including the multiple hierarchy descriptor shown in FIG. 2. A method for processing a 3D broadcast signal when the multiple hierarchy descriptor is contained in the VCT according to one embodiment of the present invention will hereinafter be described with reference to FIGS. 2, 6, and 9.

First, the digital broadcast receiver receives the VCT including the multiple hierarchy descriptor according to one embodiment of the present invention at step S901.

The digital broadcast receiver acquires information of each program element of multi-view streams transmitted over a specific virtual channel from the channel loop shown in FIG. 6 at step S902. For example, the virtual channel is identified by a major channel number, a minor channel number, a TSID, a source_id, etc.

Accordingly, information of each program element of the multi-view streams capable of being received over a single virtual channel is acquired through the multiple hierarchy descriptor shown in FIG. 2.

The digital broadcast receiver acquires a value of the 'hierarchy_layer_index' field of a corresponding stream using not only the elementary_PID field of FIG. 6 but also its associated descriptor, and then acquires information of a stream to be accessed before decoding of the corresponding stream at step S903. For example, the stream to be accessed is identified by a value of the 'hierarchy_embedded_layer_index' field.

The digital broadcast receiver may determine whether the dependent ES is received over the same channel as a transmission channel of a current descriptor using the 'same_channel_flag' field shown in FIG. 2 at step S904.

In the case where the dependent ES is transmitted over the same channel as the transmission channel of the current descriptor at step S904, the digital broadcast receiver identifies a stream corresponding to the 'hierarchy_embedded_layer_index' value using the 'elementary_PID' field associated with the descriptor including the 'hierarchy_layer_index' field, and then receives the identified stream at step S905. Furthermore, the digital broadcast receiver may extract a corresponding elementary stream (ES) using the value of the 'elementary_PID' field.

On the other hand, in the case where the dependent ES is transmitted over another channel at step S904, the digital broadcast receiver acquires signaling information (for example, channel information, a reception mode, or information of a reception available time, etc.) necessary for receiving a stream corresponding to the 'hierarchy_embedded_layer_index' value by means of data shown in FIG. 3, and then receives the stream using the above-mentioned signaling information at step S906.

In the meantime, specific information, indicating whether a stream corresponding to the 'hierarchy_embedded_layer_index' value and a stream corresponding to the 'hierarchy_layer_index' value are transmitted over the same channel or different channels, is determined, for example, by the value of the 'same_channel_flag' field shown in FIG. 2.

The digital broadcast receiver decodes the first dependent ES identified by the 'hierarchy_layer_index' value, the second dependent ES identified by the 'hierarchy_embedded_layer_index' value, and the base ES at step S907.

The digital broadcast receiver formats the decoded first dependent ES, the decoded second dependent ES, and the decoded base ES according to setup information of the digital broadcast receiver, such that it outputs a 3D video signal at step S908. For example, the base ES means an independent ES that need not refer to another ES.

Therefore, in accordance with one embodiment of the present invention, not all elementary streams (ESs) are necessary to be decoded.

Figure 10:
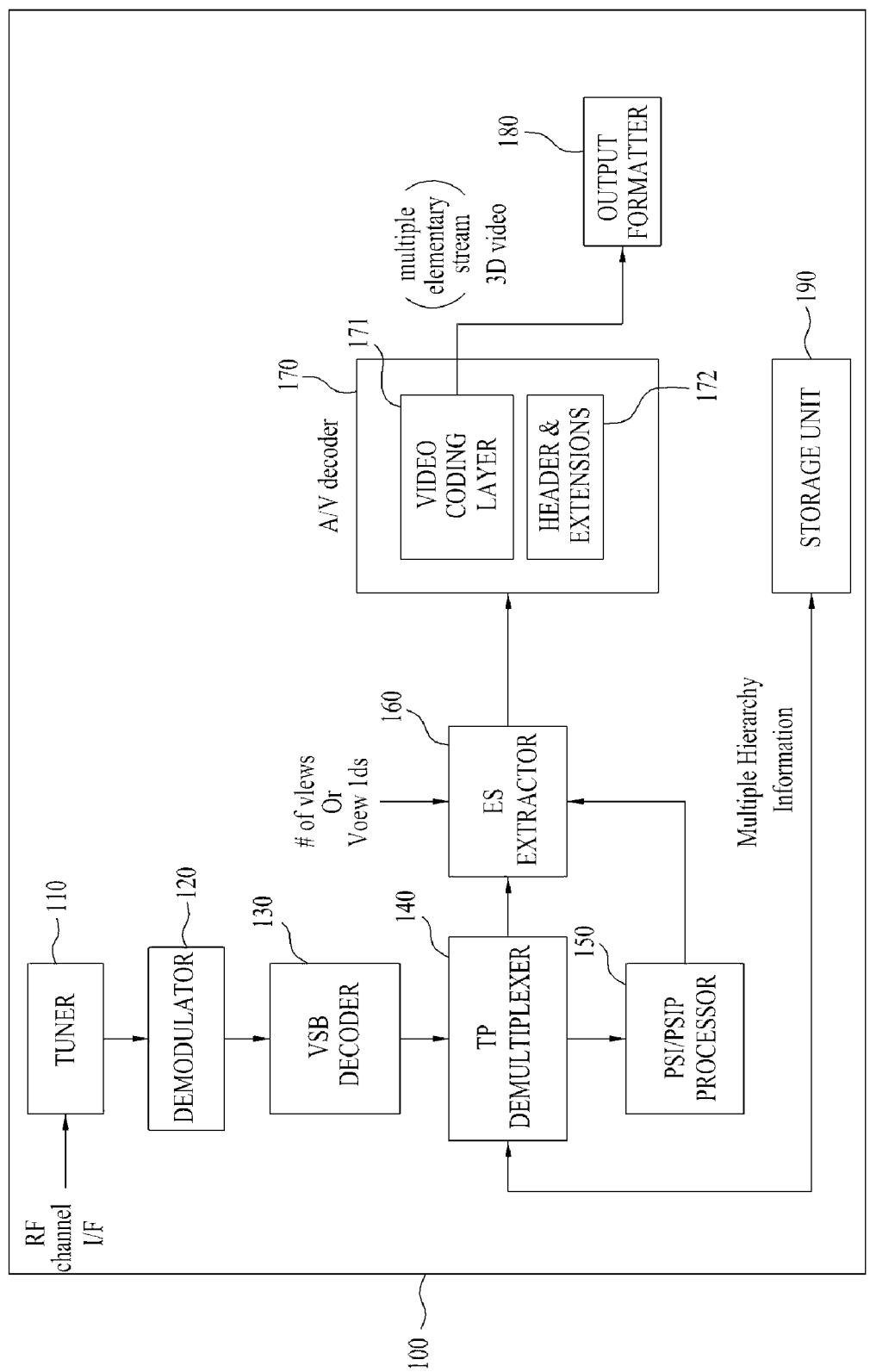
FIG. 10 is a block diagram illustrating a digital broadcast receiver for processing a 3D broadcast signal including the multiple hierarchy descriptor according to an embodiment of the present invention.

FIG. 10 is a block diagram illustrating a digital broadcast receiver for processing a 3D broadcast signal including the multiple hierarchy descriptor according to an embodiment of the present invention. For example, each block shown in FIG. 10 may be implemented in the form of a module, and the module may indicate a single unit capable of processing a specific function or operation. In addition, the module may be implemented by hardware, software, or a combination thereof.

Referring to FIG. 10, the digital broadcast receiver 100 according to one embodiment of the present invention includes a tuner 110, a demodulator 120, a VSB decoder 130, a TP demultiplexer 140, a PSI/PSIP processor 150, an ES extractor 160, an audio/video (A/V) decoder 170, an output formatter 180, a storage unit 190, etc. The A/V decoder 170 may further include, for example, a video coding layer 171, a header & extensions unit 172, etc. In addition, names of blocks shown in FIG. 10 are disclosed only for illustrative purposes, but the blocks may also be designed as other modules having the same functions as in FIG. 10.

The tuner 110 receives a digital broadcast signal including a multiple hierarchy descriptor.

The multiple hierarchy descriptor may define the dependency among several dependent ESs constituting a 3D video signal. For example, the multiple hierarchy descriptor is contained in the PMT or the VCT. In addition, for example, the multiple hierarchy descriptor may be configured in the form of a descriptor shown in FIG. 1 or FIG. 2.

The PSI/PSIP processor 150 identifies at least one of a second dependent ES to be accessed to decode the first dependent ES based on a first field contained in the multiple hierarchy descriptor, and then identifies signaling information of the second dependent ES based on a second field contained in the multiple hierarchy descriptor. For example, the first field may correspond to the 'hierarchy_embedded_layer_index' field shown in FIG. 1 or FIG. 2, and the second field may correspond to the 'same_channel_flag' field shown in FIG. 1 or FIG. 2.

The ES extractor 160 may extract a first dependent ES and a second dependent ES which are distinguished from each other as described above.

The A/V decoder 170 decodes the extracted first dependent ES, the extracted second dependent ES, and the extracted base ES.

The output formatter 180 formats the decoded first dependent ES, the decoded second dependent ES, and the decoded base ES, such that it outputs a three dimensional (3D) video signal.

Furthermore, when the second field has a value indicating that the dependent ES is received over a different channel, the PSI/PSIP processor 150 detects the signaling information. When the transmission_mode contained in the detected signaling information does not correspond to a simultaneous broadcast mode, the tuner receives the dependent ES from the start time contained in the detected signaling information.

In brief, the PSI/PSIP processor 150 may parse elementary streams (ESs) necessary for decoding a Multiple View Video (MVC) coding signal using the multiple hierarchy descriptor that is contained in the PMT or VCT and transmitted. Therefore, in accordance with one embodiment of the present invention, not all elementary streams (ESs) or program elements constituting the multi-view stream are necessary to be transmitted to the A/V decoder, and only the necessary ESs or program elements are filtered so that the filtered result may be transmitted to the A/V decoder 170. In addition, the ES extractor 160 is able to filter only the ES to be transferred to the A/V decoder 170, using the predetermined view numbers, the view ID, and the multiple hierarchy descriptor acquired from the PSI/PSIP processor 150.

In the case where the transmission_mode is not equal to the simultaneous broadcast mode, a firstly-received ES is stored in the storage unit 190. After that, in the case where all the associated ESs are received, the received associated ESs are uploaded to the TP demultiplexer 140.

The method disclosed in the present invention may be implemented in the form of program commands executable by a variety of computer means, and recorded on a computer-readable recording medium. The computer-readable recording medium may include program commands, data files, data structures, etc. individually or in combination. The program commands recorded on the medium may be ones specially designed and configured for the present invention or ones known and available to those skilled in computer software. Examples of the computer-readable recording medium include magnetic media such as a hard disk, a floppy disk and a magnetic tape, optical media such as a compact disc read only memory (CD-ROM) and a digital versatile disc (DVD), magneto-optical media such as a floptical disk, and hardware devices specially configured to store and execute program commands, such as a ROM, a random access memory (RAM) and a flash memory. Examples of the program commands include high-level language codes that may be executed by a computer using an interpreter, etc., as well as machine language codes such as those produced by a compiler. The above-stated hardware devices may be configured to operate as one or more software modules to perform the operation of the present invention, and vice versa.

Although the present invention has been described in conjunction with the limited embodiments and drawings, the present invention is not limited thereto. Those skilled in the art will appreciate that various modifications, additions and substitutions are possible from this description. Therefore, the scope of the present invention should not be limited to the description of the exemplary embodiments and should be determined by the appended claims and their equivalents.

Mode for the Invention

Various embodiments have been described in the best mode for carrying out the invention.

INDUSTRIAL APPLICABILITY

As apparent from the above description, embodiments of the present invention may be wholly or partially applied to a digital broadcasting system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for processing a three dimensional (3D) video signal, the method comprising:
receiving a digital broadcast signal including a multiple hierarchy descriptor, wherein the multiple hierarchy descriptor includes a first field identifying an Elementary Stream (ES), a second field indicating a number of dependent Elementary Streams (ESs) which are to be accessed before decoding of the ES identified by the first field, a third field indicating whether each of the dependent ESs is received over the same channel as a physical transmission channel of the multiple hierarchy descriptor, a fourth field specifying index of each of the dependent ESs to be accessed before decoding to the ES identified by the first field and signaling information for the each of the dependent ESs identified by the fourth field when the third field indicates each of the dependent ESs is received over a channel different from a transmission channel of the multiple hierarchy descriptor,
wherein the multiple hierarchy descriptor further includes a hierarchy type specifying whether the ES corresponds to a stream of a base layer or a stream of a multi-view profile, and
wherein the signaling information includes a transmission channel field specifying the channel transmitting each of the dependent ESs when the dependent ESs are transmitted over the channel different from the physical transmission channel of the multiple hierarchy descriptor as indicated by the third field, a transmission mode field indicating whether each of the dependent ESs can be received simultaneously with the ES or not, and start time information specifying a reception start time for receiving the dependent ESs, when transmission mode field indicates that the dependent ESs are received non-simultaneously with the ES;

detecting the signaling information, when the third field has a specific value indicating a case where the dependent ESs are received over a channel different from the transmission channel of the multiple hierarchy descriptor;

identifying the number of the dependent ESs based on the second field;

decoding the ES and the dependent ESs based on information included in the multiple hierarchy descriptor; and outputting a three dimensional (3D) video signal by using the decoded ES and dependent ESs.

2. The method according to claim 1, wherein the multiple hierarchy descriptor defines dependency among several dependent ESs constituting the 3D video signal.

3. The method according to claim 1, further comprising:
receiving the dependent ESs from the reception start time included in the detected signaling information, if the transmission mode included in the detected signaling information does not correspond to a simultaneous broadcast mode.

4. The method according to claim 1, wherein the digital broadcast signal includes a Program Map Table (PMT) or a Virtual Channel Table (VCT).

5. The method according to claim 1, wherein:
the decoding includes
decoding the dependent ESs, and a base ES, and
the outputting includes
outputting the 3D video signal by formatting the dependent ESs, and the base ES.

6. A digital broadcast receiver for processing a three dimensional (3D) video signal, the digital broadcast receiver comprising:
a tuner configured to receive a digital broadcast signal including a multiple hierarchy descriptor, wherein the multiple hierarchy descriptor includes a first field identifying an Elementary Stream (ES), a second field indicating a number of dependent Elementary Streams (ESs) which are to be accessed before decoding of the ES identified by the first field, a third field indicating whether each of the dependent ESs is received over the same channel as a physical transmission channel of the multiple hierarchy descriptor, a fourth field specifying index of each of the dependent ESs to be accessed before decoding of the ES identified by the first field, and signaling information for the each of the dependent ESs identified by the fourth field when the third field indicates each of the dependent ESs is received over a channel different from a transmission channel of the multiple hierarchy descriptor, wherein the multiple hierarchy descriptor further includes a hierarchy type specifying whether the ES corresponds to a stream of a base layer or a stream of a multi-view profile, and wherein the signaling information includes a transmission channel field specifying the channel transmitting each of the dependent ESs when the dependent ESs are transmitted over the channel different from the physical transmission channel of the multiple hierarchy descriptor as indicated by the third field, a transmission mode field indicating whether each of the dependent ESs can be received simultaneously with the ES or not, and start time information specifying a reception start time for receiving the dependent ESs, when transmission mode field indicates that the dependent ESs are received non-simultaneously with the ES;

a Program Specific Information (PSI) / Program and System Information Protocol (PSIP) processor configured to identify the number of the dependent ESs based on the second field;

a decoder configured to decode the ES and the dependent ESs based on information included in the multiple hierarchy descriptor; and an output formatter configured to output a three dimensional (3D) video signal by using the decoded ES and dependent ESs, wherein the PSI/PSIP processor detects the signaling information if a value of the third field means a specific case in which the dependent ESs are received over a channel different from the transmission channel of the multiple hierarchy descriptor.

7. The digital broadcast receiver according to claim 6, wherein the multiple hierarchy descriptor defines dependency among several dependent ESs constituting the 3D video signal.

8. The digital broadcast receiver according to claim 6, wherein the tuner receives the dependent ESs from the reception start time included in the detected signaling information, if the transmission mode included in the detected signaling information does not correspond to a simultaneous broadcast mode.

9. The digital broadcast receiver according to claim 6, wherein the digital broadcast signal includes a Program Map Table (PMT) or a Virtual Channel Table (VCT).

10. The digital broadcast receiver according to claim 6, wherein:
the decoder decodes
the dependent ESs, and a base ES, and
the output formatter formats
the dependent ESs, and the base ES.

11. The method according to claim 1, wherein the signaling information further include a hierarchy program start time field specifying a time from when the dependent ESs can be received when the transmission mode indicates that the dependent ES s cannot be received simultaneously with the ES.

12. The digital broadcast receiver according to claim 6, wherein the signaling information further include a hierarchy program start time field specifying a time from when the dependent ESs can be received when the transmission mode indicates that the dependent ESs cannot be received simultaneously with the ES.

* * * * *